United States Patent
Deng et al.

(10) Patent No.: US 9,184,786 B2
(45) Date of Patent: Nov. 10, 2015

(54) SYSTEMS AND METHODS FOR CLOCK CALIBRATION FOR SATELLITE NAVIGATION

(71) Applicant: Marvell World Trade Ltd., St. Michael (BB)

(72) Inventors: Jiangping Deng, Shanghai (CN); Zhike Jia, Fremont, CA (US); Jian Cheng, Shanghai (CN); Hongquan Liu, Shanghai (CN); Mengxin Liao, Shanghai (CN)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/533,521

(22) Filed: Nov. 5, 2014

(65) Prior Publication Data

US 2015/0139279 A1    May 21, 2015

Related U.S. Application Data

(60) Provisional application No. 61/906,184, filed on Nov. 19, 2013.

(51) Int. Cl.
*H04B 1/00* (2006.01)
*H04B 1/7073* (2011.01)

(52) U.S. Cl.
CPC .................................. *H04B 1/7073* (2013.01)

(58) Field of Classification Search
CPC ................. H04B 1/707; H04B 1/7073; H04B 2201/70715
See application file for complete search history.

(56) References Cited

U.S. PATENT DOCUMENTS

| 6,684,158 | B1 * | 1/2004 | Garin et al. | 701/470 |
| 2003/0211837 | A1 * | 11/2003 | Kitatani | 455/192.1 |
| 2007/0152876 | A1 * | 7/2007 | Wang et al. | 342/357.02 |
| 2007/0285309 | A1 * | 12/2007 | Atkinson | 342/357.12 |
| 2011/0102257 | A1 * | 5/2011 | Spyropoulos et al. | 342/357.31 |

* cited by examiner

*Primary Examiner* — Syed Haider

(57) ABSTRACT

System and methods are provided for clock calibration. A satellite navigation system includes: a timing component configured to determine a counting period for clock calibration; a counter network configured to determine a first number of local clock periods associated with a local clock of the satellite navigation system during the counting period and determine a second number of external clock periods associated with an external clock during the counting period; and a processor configured to perform calibration for the local clock based at least in part on the first number of the local clock periods and the second number of the external clock periods.

17 Claims, 6 Drawing Sheets

SYSTEMS AND METHODS FOR CLOCK CALIBRATION FOR SATELLITE NAVIGATION

CROSS-REFERENCE TO RELATED APPLICATIONS

This disclosure claims priority to and benefit from U.S. Provisional Patent Application No. 61/906,184, filed on Nov. 19, 2013, the entirety of which is incorporated herein by reference.

FIELD

The technology described in this patent document relates generally to satellite based navigation and more particularly to clock calibration for satellite navigation.

BACKGROUND

Satellite based navigation systems are widely used. Global navigation satellite systems (GNSS) include Global Positioning System (GPS) (United States), GLONASS (Russia), Galileo (Europe), and COMPASS (China). A GNSS often involves a plurality of satellites orbiting the Earth, and the plurality of satellites form a constellation of satellites. Each satellite transmits a navigation message periodically that can be received and used by a GNSS receiver to derive position, velocity, and/or time. For example, GPS navigation systems can acquire and track GPS satellite signals so that range measurements can be made between several satellites and a GPS receiver in order to compute a location for the receiver. A metric of acquisition performance is time to first fix (TTFF). The TTFF may depend on the accuracy of the receiver's previous estimate of GPS time within the receiver's local timing system.

Electronic devices (e.g., a mobile phone, a tablet computer, a camera, etc.) often include a GPS receiver. Different clocks may be used for different function modules in such electronic devices. For example, a clock used for the GPS receiver corresponds to a local clock of the GPS receiver, while other clocks may correspond to external clocks relative to the GPS receiver. The local clock of the GPS receiver provides a reference frequency source so as to generate a local carrier that is used for GPS signal down conversion in a radio frequency (RF) front end and GPS signal mixing in a baseband.

SUMMARY

In accordance with the teachings described herein, system and methods are provided for clock calibration. A satellite navigation system includes: a timing component configured to determine a counting period for clock calibration; a counter network configured to determine a first number of local clock periods associated with a local clock of the satellite navigation system during the counting period and determine a second number of external clock periods associated with an external clock during the counting period; and a processor configured to perform calibration for the local clock based at least in part on the first number of the local clock periods and the second number of the external clock periods.

In one embodiment, a method is provided for clock calibration for a satellite navigation system. A counting period for clock calibration of a satellite navigation system is determined. A first number of local clock periods associated with a local clock of the satellite navigation system during the counting period are determined. A second number of external clock periods associated with an external clock during the counting period are determined. Calibration is performed for the local clock of the satellite navigation system based at least in part on the first number of the local clock periods and the second number of the external clock periods.

In another embodiment, a mobile device includes: one or more processors; a satellite navigation system; and a computer-readable storage medium encoded with instructions for commanding the data processors to execute operations. A counting period for clock calibration of a satellite navigation system is determined. A first number of local clock periods associated with a local clock of the satellite navigation system during the counting period are determined. A second number of external clock periods associated with an external clock during the counting period are determined. Calibration is performed for the local clock of the satellite navigation system based at least in part on the first number of the local clock periods and the second number of the external clock periods.

DETAILED DESCRIPTION

Figure 1:
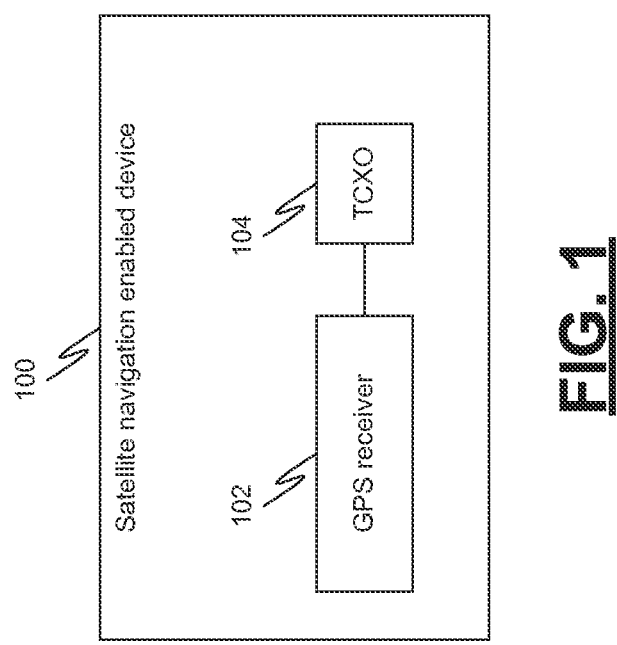
FIG. 1 depicts an example diagram showing a satellite navigation enabled device.

Time to first fix (TTFF) of a GPS receiver often depends on the accuracy of the receiver's previous estimate of GPS time within its local timing system. As shown in FIG. 1, when a GPS receiver 102 (e.g., in a satellite navigation enabled device 100) is turned off, an estimate of the GPS time is often maintained with a local clock 104 based on a temperature compensated crystal oscillator (TCXO). For example, a calibrated clock frequency value is stored in a memory associated with the local clock 104 for future use. However, the frequency of the local clock 104 often changes with temperature and over time. When the receiver 102 starts, the stored calibrated clock frequency value may not be accurate any longer, which may cause problems. For example, the inaccuracy in the calibrated clock frequency value may introduce a frequency error into a Doppler frequency of a GPS signal during the down conversion. A larger scope for Doppler frequency search may be needed in order to capture a GPS signal, which may result in a much longer TTFF.

Figure 2:
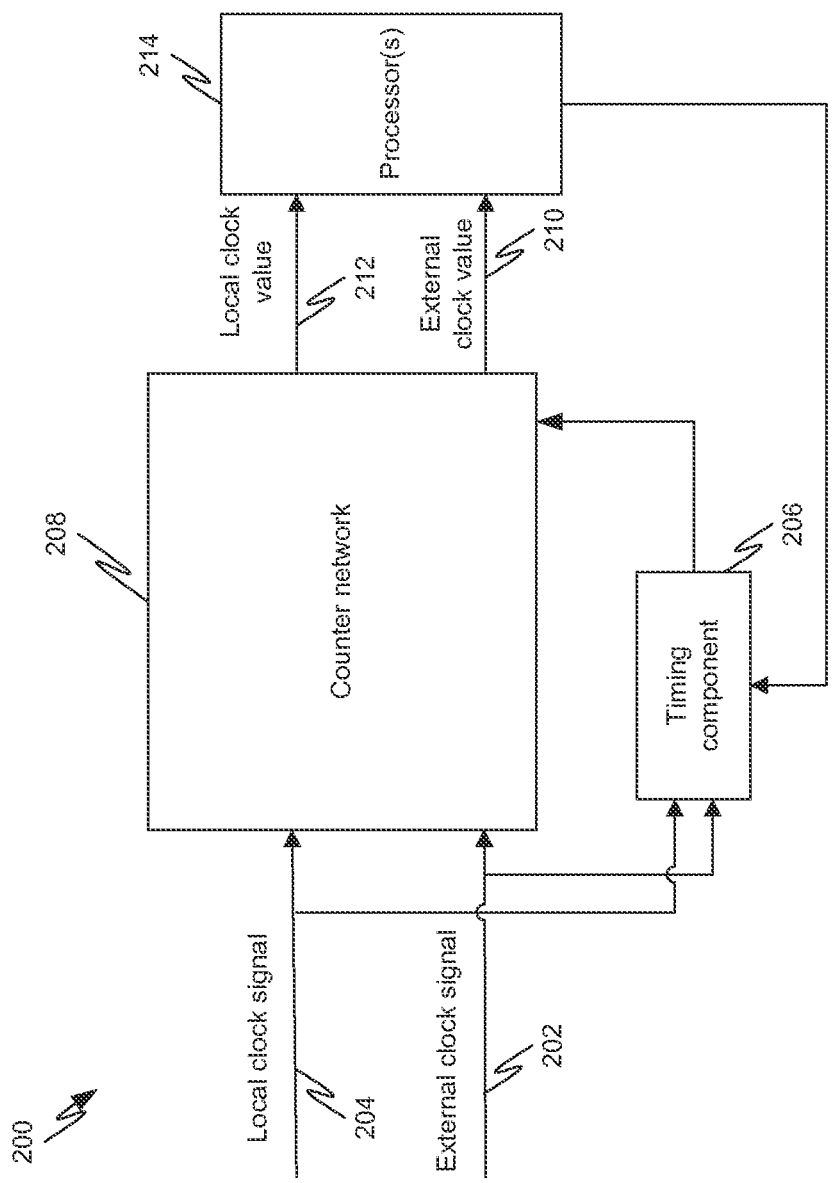
FIG. 2 depicts an example diagram showing certain components of a satellite navigation system.

FIG. 2 depicts an example diagram showing certain components of a satellite navigation system. As shown in FIG. 2, an external clock signal 202 is introduced into the satellite navigation system 200 (e.g., a GPS receiver) and clock calibration of the satellite navigation system 200 is performed using both the external clock signal 202 and a local clock signal 204. For example, the satellite navigation system 200 is included in a mobile device (e.g., a smart phone, a tablet). The external clock signal 202 is provided by another function module of the mobile device, for example, a modem clock that is calibrated by a communication network (e.g., GSM/CDMA). The local clock signal 204 is provided by a local clock (not shown) of the satellite navigation system 200.

Specifically, a timing component 206 determines a counting period for clock calibration. A counter network 208 counts a number of local clock periods associated with the local clock signal 204 of the satellite navigation system 200 during the counting period and a number of external clock periods associated with the external clock signal 202 during the counting period. The counter network 208 outputs local clock values 212 related to the counted number of local clock periods during the counting period, and outputs external clock values 210 related to the counted number of external clock periods during the counting period. One or more processors 214 determine a calibration ratio based on the local clock values 212 and the external clock values 210 and perform calibration for the local clock of the satellite navigation system 200 using the calibration ratio.

Figure 3:
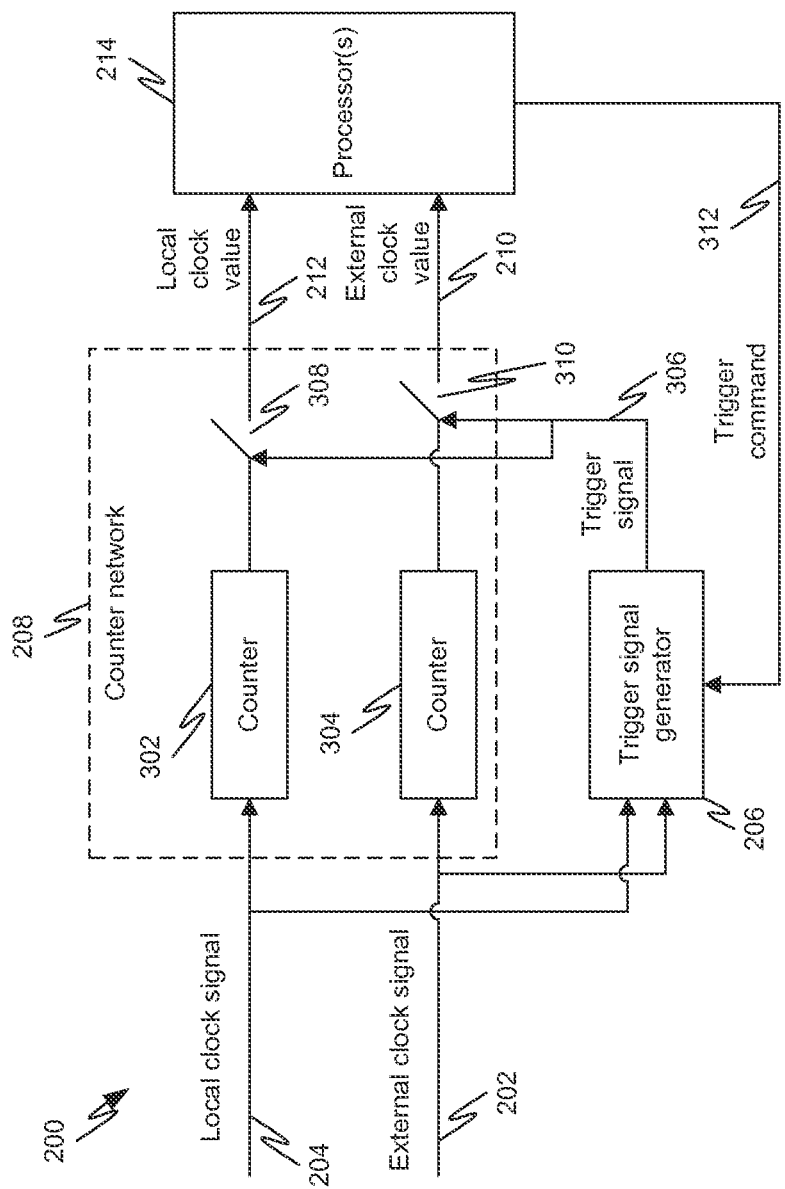
FIG. 3 depicts another example diagram showing certain components of a satellite navigation system.

FIG. 3 depicts another example diagram showing certain components of the satellite navigation system 200. As shown in FIG. 3, during the counting period determined by the timing component 206 (e.g., a trigger signal generator), a counter 302 in the counter network 208 determines a number of local clock periods of the local clock signal 204, and another counter 304 determines a number of external clock periods of the external clock signal 202.

Specifically, the counters 302 and 304 have an N-bit width. When a rising edge or a falling edge of the local clock signal 204 arrives, the counter 302 increases a local count by 1. When the local count exceeds $2^N-1$, the counter 302 resets the local count to 0. Similarly, when a rising edge or a falling edge of the external clock signal 202 arrives, the counter 304 increases an external count by 1. When the external count exceeds $2^N-1$, the counter 304 resets the external count to 0. The processors 214 generates a trigger command 312 for clock calibration, and the timing component 206 outputs a snapshot trigger signal 306 which may be synchronized with the local clock signal 304 or the external clock signal 302 for clock calibration. For example, if the local clock signal 204 has a higher frequency than the external clock signal 202, the snapshot trigger signal 306 is synchronized with the external clock signal 202. If the local clock signal 204 has a lower frequency than the external clock signal 202, the snapshot trigger signal 306 is synchronized with the local clock signal 204. When a rising edge or a falling edge of the snapshot trigger signal 306 arrives, switches 308 and 310 are closed (e.g., being turned on), and the processors 214 receives a local clock value and an external clock value through the switches 308 and 310 respectively.

Figure 4:
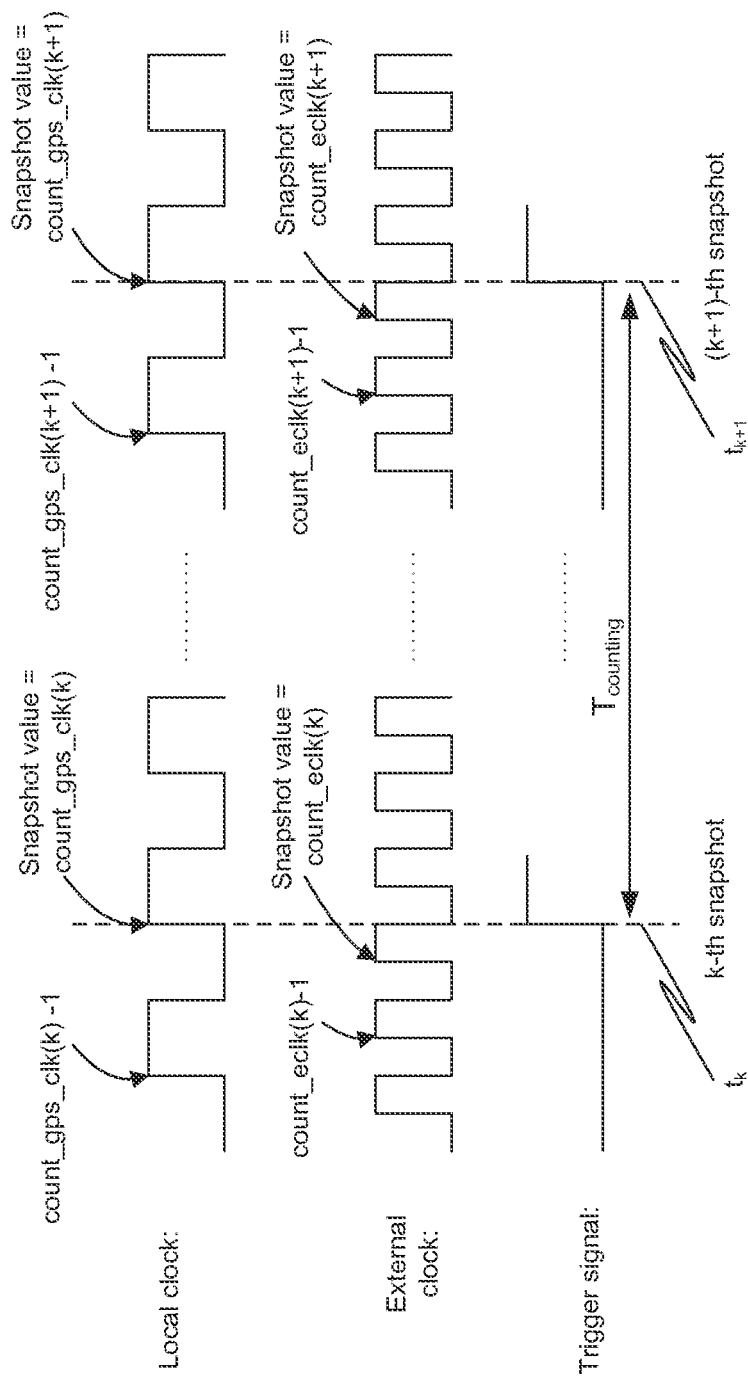
FIG. 4 depicts an example diagram showing a local clock signal, an external clock signal, and a snapshot trigger signal.

FIG. 4 depicts an example diagram shop Ting the local clock signal 204, the external clock signal 202, and the snapshot trigger signal 306. As shown in FIG. 4, the local clock signal 204 has a lower frequency than the external clock signal 202, and the snapshot trigger signal 306 is synchronized with the local clock signal 204 for clock calibration.

Specifically, a rising edge of the snapshot trigger signal 306 is synchronized with a rising edge of the local clock signal 204 (e.g., at $t_k$). In response to the rising edge of the local clock signal 204 (e.g., at $t_k$), the counter 302 increases a local count (e.g., count_gps_clk(k)) by 1. The counter 304 has already increased an external count (e.g., count_eclk(k)) by 1 in response to a rising edge of the external clock signal 202 (e.g., earlier than $t_k$). In response to the rising edge of the snapshot trigger signal 306, the switches 308 and 310 are turned on, and count values of the local count (e.g., count_gps_clk(k)) and the external count (e.g., count_eclk(k)) are provided to the processors 214.

A next rising edge of the snapshot trigger signal 306 arrives (e.g., at $t_{k+1}$) and is synchronized with another rising edge of the local clock signal 204. The counting period (e.g., $T_{counting}$) corresponds to a time period between the two rising edges of the snapshot trigger signal 306. During the counting period, the counter 302 increases the local count (e.g., count_gps_clk(k)) by 1 in response to every rising edge of the local clock signal 204, and the counter 304 increases the external count (e.g., count_eclk(k)) by 1 in response to every rising edge of the external clock signal 202. In response to the next rising edge of the snapshot trigger signal 306 (e.g., at $t_{k+1}$), the switches 308 and 310 are turned on again, and current count values of the local count (e.g., count_gps_clk(k)) and the external count (e.g., count_eclk(k)) are provided to the processors 214. The processors 214 determines a difference between the count values of the local count obtained at different times $t_k$ and $t_{k+1}$, and a difference between count values of the external count obtained at different times $t_k$ and $t_{k+1}$ for clock calibration.

For example, the difference between the count values of the local count obtained at different times $t_k$ and $t_{k+1}$ is determined as follows:

$$\Delta count\_gps\_clk = \begin{cases} count\_gps\_clk(k+1) - count\_gps\_clk(k), & count\_gps\_clk(k+1) > count\_gps\_clk(k) \\ 2^N + count\_gps\_clk(k+1) - count\_gps\_clk(k), & count\_gps\_clk(k+1) \le count\_gps\_clk(k) \end{cases}$$

where count_gps_clk represents a count value of the local count, and N represents a bit width of the counters 302 and 304. The difference between the count values of the external count obtained at different times $t_k$ and $t_{k+1}$ is determined as follows:

$$\Delta count\_eclk = \begin{cases} count\_eclk(k+1) - count\_eclk(k), & count\_eclk(k+1) > count\_eclk(k) \\ 2^N + count\_eclk(k+1) - count\_eclk(k), & count\_eclk(k+1) \le count\_eclk(k) \end{cases}$$

where count_eclk represents a count value of the external count.

A local clock frequency of the local clock signal 204 is determined as follows:

$$f_{gps\_clk} = \frac{\Delta count\_gps\_clk}{\Delta count\_eclk} \cdot f_{eclk}$$

where $f_{gps\_clk}$ represents the local clock frequency of the local clock signal 204, $f_{eclk}$ represents an external clock frequency associated with the external clock signal 202, and k represents a $k^{th}$ snapshot corresponding to a $k^{th}$ edge of the snapshot trigger signal 306.

In some embodiments, when the satellite navigation system 200 (e.g., a GPS receiver) is in communication with one or more satellites of a GNSS system (e.g., a GPS system) for positioning, the local clock of the satellite navigation system 200 may be calibrated by a system time of the GNSS system, and then the external clock may be calibrated using the calibrated local clock. For example, an external clock frequency of the external clock signal 202 is determined as follows:

$$f'_{eclk} = \frac{\Delta\text{count\_eclk}}{\Delta\text{count\_gps\_clk}} \cdot f'_{gps\_clk}$$

where $f'_{gps\_clk}$ represents a local clock frequency calibrated by the system time of the GNSS system, and $f'_{eclk}$ represents an external clock frequency calibrated by the local clock frequency.

As an example, the external clock may be calibrated according to the system time of the GNSS system.

$$f'_{eclk} = \frac{\Delta\text{count\_eclk}}{\text{gps\_time}(k+1) - \text{gps\_time}(k)}$$

where gps_time represents the system time of the GNSS system, and $f'_{eclk}$ represents an external clock frequency calibrated by the system time. For example, the system time is related to the time of the local clock. The calibrated external clock may be used to maintain a satellite navigation time when the satellite navigation system 200 is off (e.g., being powered down).

Count values of the local count and the external count may be integers. For example, the counting period includes a number of entire local clock periods, while the counting period may include a number of entire external clock periods and a fractional external clock period. A count value of the external count may not reflect the fractional external clock periods. For example, the error is no larger than one external clock period. A frequency error for the local clock frequency related to the fractional external clock period can be calculated as follows:

$$\Delta f_{gps\_clk} = \begin{cases} \dfrac{f_{gps\_clk}}{f_{eclk} \cdot T - 1}, & f_{gps\_clk} < f_{eclk} \\ 1/T, & f_{gps\_clk} \geq f_{clk} \end{cases}$$

where $\Delta f_{gps\_clk}$ represents a frequency error for the local clock frequency of the local clock signal 204 after calibration using the external clock signal 202, and T represents a duration of the counting period. To reduce the frequency error for the local clock frequency, the counting period may be selected to have a long duration, e.g., 1 second.

In some embodiments, a frequency error for the external clock frequency related to the fractional external clock period can be calculated as follows:

$$\Delta f_{eclk} = \begin{cases} \dfrac{f_{eclk}}{f_{gps\_clk} \cdot T - 1}, & f_{eclk} < f_{gps\_clk} \\ 1/T, & f_{eclk} \geq f_{gps\_clk} \end{cases}$$

where $\Delta f_{eclk}$ represents a frequency error for the external clock frequency of the external clock signal 202 after calibration using the local clock signal 202.

The clock calibration scheme described is merely an example, and variations, alternatives, and/or modifications may be implemented for clock calibration. In some embodiments, a rising edge of the snapshot trigger signal 306 may be synchronized with a falling edge of the local clock signal 204 for clock calibration. In certain embodiments, a falling edge of the snapshot trigger signal 306 is synchronized with a rising edge or a falling edge of the local clock signal 204 for clock calibration. In some embodiments, if the local clock signal 204 has a higher frequency than the external clock signal 202, a rising edge or a falling edge of the snapshot trigger signal 306 is synchronized with a rising edge or a falling edge of the external clock signal 202 for clock calibration.

Figure 5:
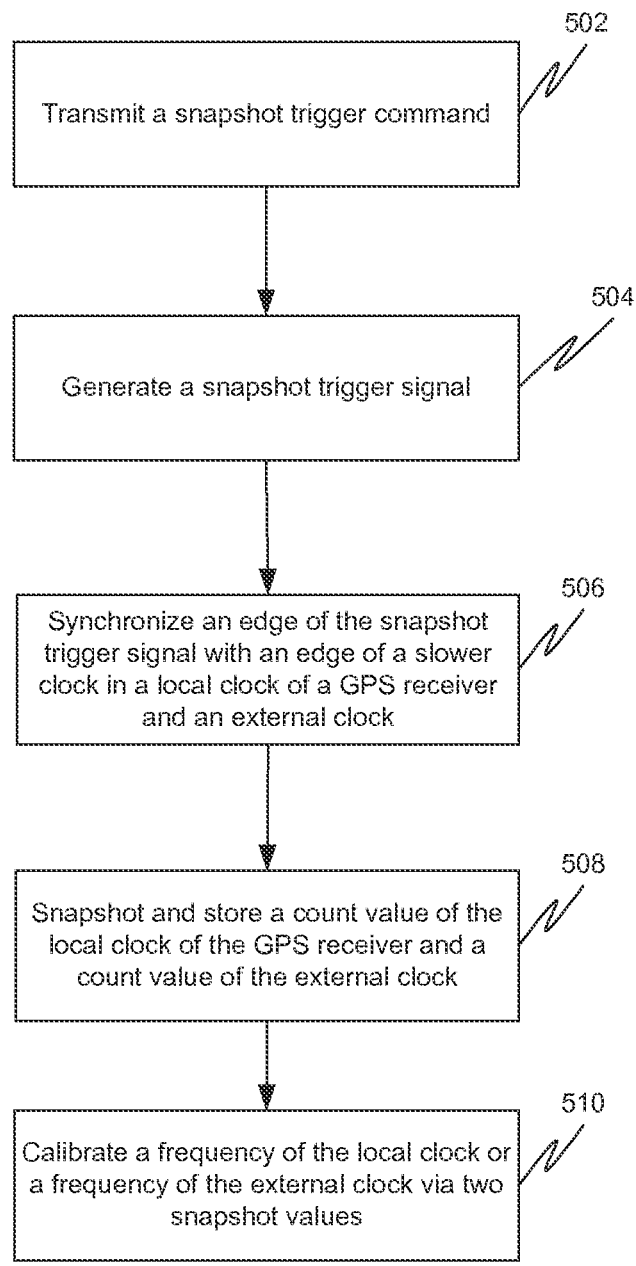
FIG. 5 depicts an example diagram showing a flow chart for clock calibration.

FIG. 5 depicts an example diagram showing a flow chart for clock calibration. As shown in FIG. 5, at 502, a snapshot trigger command is transmitted (e.g., by the one or more processors 214). At 504, a snapshot trigger signal is generated (e.g., by a trigger signal generator). A local clock signal of a satellite navigation system (e.g., a GPS receiver) and an external clock signal are received. At 506, an edge (e.g., a rising edge or a falling edge) of the snapshot trigger signal with an edge (e.g., a rising edge or a failing edge) of a slower clock signal between the local clock signal and the external clock signal. At 508, count values related to the local clock signal and count values related to the external clock signal are acquired and stored for clock calibration. At 510, a local clock frequency of the local clock signal is calibrated using the count values related to the local clock signal and the count values related to the external clock signal.

Figure 6:
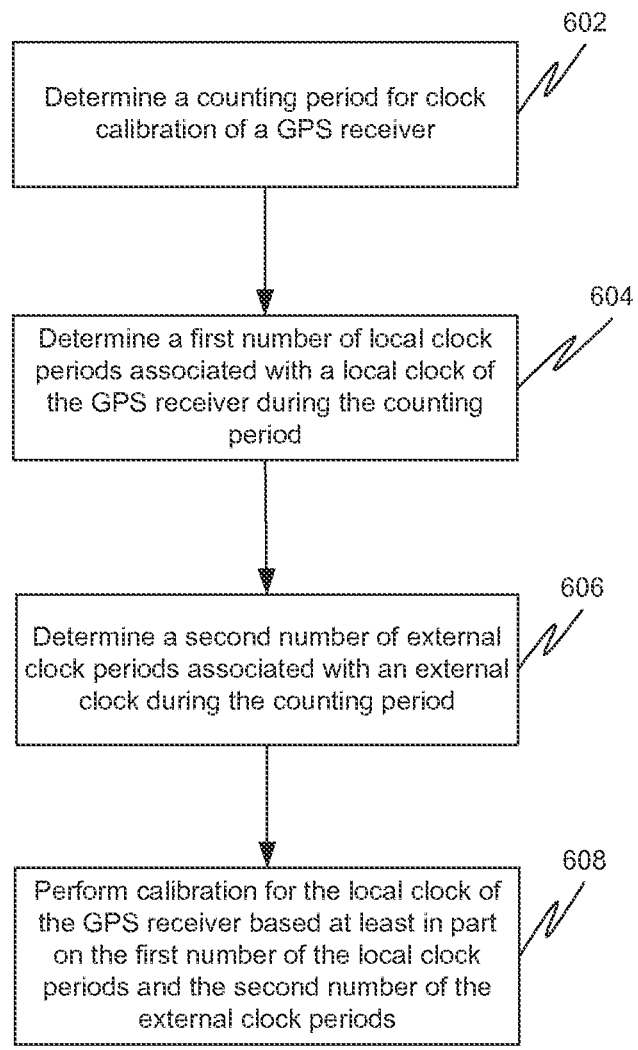
FIG. 6 depicts another example diagram showing a flow chart for clock calibration.

FIG. 6 depicts an example diagram showing another flow chart for clock calibration. At 602, a counting period for clock calibration of a satellite navigation system is determined. At 604, a first number of local clock periods associated with a local clock of the satellite navigation system during the counting period are determined. At 606, a second number of external clock periods associated with an external clock during the counting period are determined. At 608, calibration is performed for the local clock of the satellite navigation system based at least in part on the first number of the local clock periods and the second number of the external clock periods.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:
1. A satellite navigation system comprising:
a timing component configured to determine a counting period for clock calibration;
a counter network comprising, a local clock counter configured to determine a first number of local clock periods associated with a local clock of the satellite navigation system during the counting period, and
an external clock counter configured to determine a second number of external clock periods associated with an external clock during the counting period; and
a processor configured to,
determine a local clock value associated with the first number of the local clock periods,
determine an external clock value associated with the second number of the external clock period, and
determine a calibration ratio to be equal to the local clock value divided by the external clock value for clock calibration of the local clock.

2. The system of claim 1, wherein the timing component includes:
a trigger signal generator configured to generate a first trigger signal and a second trigger signal, the first trigger signal corresponding to a beginning of the counting period, the second trigger signal corresponding to an end of the counting period.

3. The system of claim 2, wherein the trigger signal generator is further configured to generate the first trigger signal and the second trigger signal in response to one or more commands from the processor.

4. The system of claim 2, wherein:
the trigger signal generator is further configured to, in response to a local clock frequency associated with the local clock being higher than an external clock frequency associated with the external clock, generate a first edge of the first trigger signal at a first time, a second edge of an external clock signal associated with the external clock appearing at approximately the first time; and
the trigger signal generator is further configured to, in response to the external clock frequency being higher than the local clock frequency, generate a third edge of the first trigger signal at a second time, a fourth edge of the external clock signal appearing at approximately the second time.

5. The system of claim 4, wherein:
the first edge corresponds to a rising edge or a falling edge;
the second edge corresponds to a rising edge or a falling edge;
the third edge corresponds to a rising edge or a falling edge; and
the fourth edge corresponds to a rising edge or a falling edge.

6. The system of claim 1, wherein:
the local clock counter has a N-bit width; and
the local clock value is in a range of 0 to $2^N-1$.

7. The system of claim 1, wherein:
the external clock counter has a N-bit width; and
the external clock value is in a range of 0 to $2^N-1$.

8. The system of claim 1, wherein the processor is further configured to determine a local clock frequency of the local clock to be proportional to a product of the calibration ratio and an external clock frequency of the external clock.

9. The system of claim 1, wherein:
the calibration ratio is provided for calibration of the external clock; and
an external clock frequency of the external clock is determined to be proportional to a local clock frequency of the local clock divided by the calibration ratio.

10. The system of claim 1, wherein:
the local clock includes a temperature compensated crystal oscillator; and
the external clock includes a modem clock associated with a communication network.

11. A method for clock calibration for a satellite navigation system, the method comprising:
determining a counting period for clock calibration of a satellite navigation system;
determining a first number of local clock periods associated with a local clock of the satellite navigation system during the counting period;
determining a local clock value associated with the first number of the local clock periods during the counting period;
determining a second number of external clock periods associated with an external clock during the counting, period;
determine an external clock value associated with the second number of the external clock periods during the counting period;
determine a calibration ratio to be equal to the local clock value divided by the external clock value; and
performing calibration for the local clock of the satellite navigation system based at least in part on the calibration ratio.

12. The method of claim 11, further comprising:
generating a first trigger signal and a second trigger signal, the first trigger signal corresponding to a beginning of the counting period, the second trigger signal corresponding to an end of the counting period.

13. The method of claim 12, wherein the generating a first trigger signal and a second trigger signal includes:
in response to a local clock frequency associated with the local clock being higher than an external clock frequency associated with the external clock, generating a first edge of the first trigger signal at a first time, a second edge of an external clock signal associated with the external clock appearing at approximately the first time; and
in response to the external clock frequency being higher than the local clock frequency, generating a third edge of the first trigger signal at a second time, a fourth edge of the external clock signal appearing at approximately the second time.

14. The method of claim 13, wherein:
the first edge corresponds to a rising edge or a falling edge;
the second edge corresponds to a rising edge or a falling edge;
the third edge corresponds to a rising edge or a falling edge; and
the fourth edge corresponds to a rising edge or a falling edge.

15. The method of claim 11, wherein the performing calibration for the local clock of the satellite navigation system based at least in part on the first number of the local clock periods and the second number of the external clock periods includes:
determining a local clock frequency of the local clock to be proportional to a product of the calibration ratio and an external clock frequency of the external clock.

16. The method of claim 11, further comprising:
performing calibration of the external clock based at least in part on the calibration ratio.

17. The method of claim 16, wherein an external clock frequency of the external clock is determined to be proportional to a local clock frequency of the local clock divided by the calibration ratio.

* * * * *